Aug. 13, 1968          B. H. NICOLAISEN              3,397,206
                  PRODUCTION OF CHLOROISOCYANURATES
                         Filed June 28, 1967
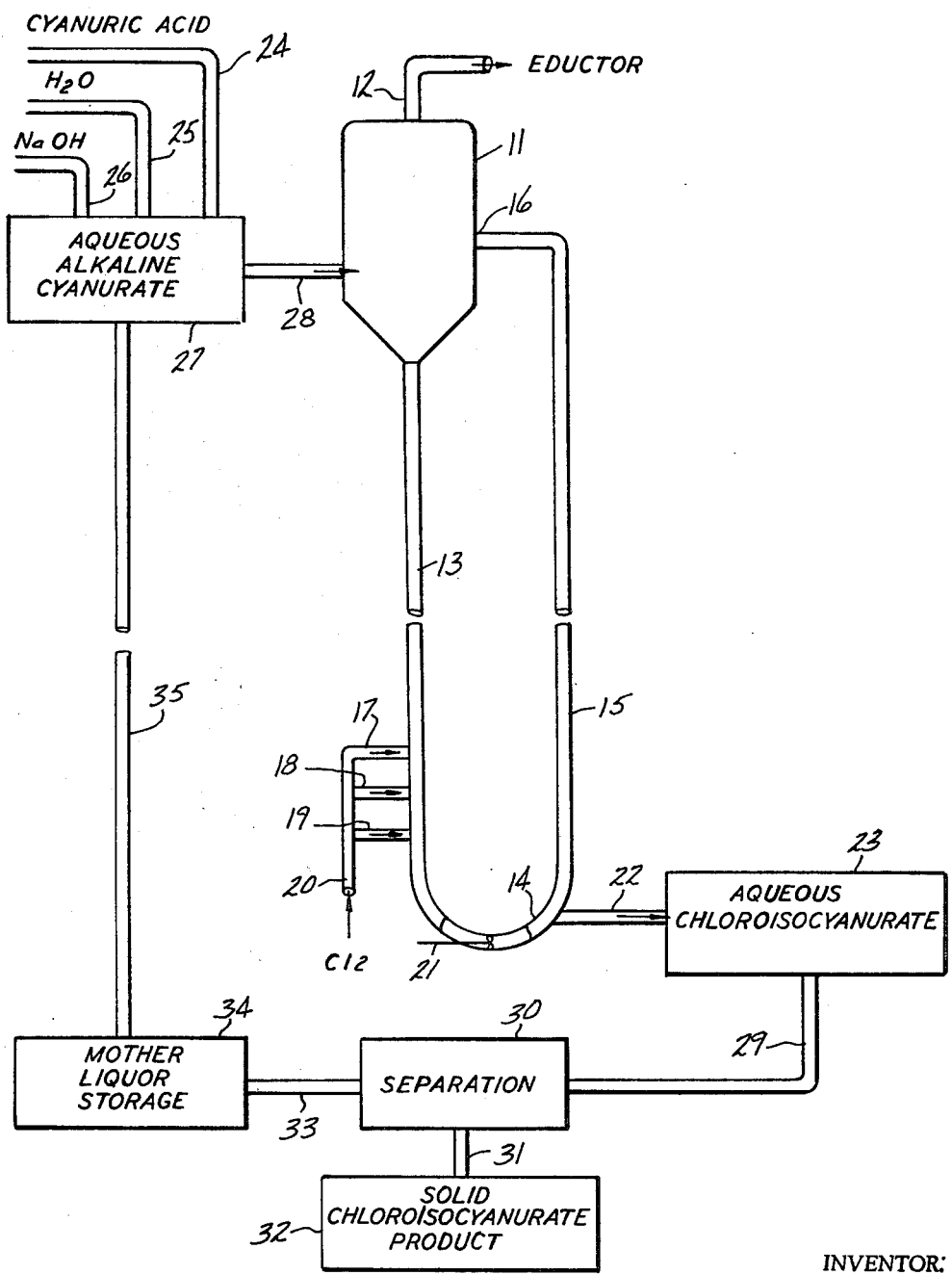
INVENTOR:
BERNARD H. NICOLAISEN
BY
AGENT United States Patent Office 3,397,206
Patented Aug. 13, 1968

3,397,206
PRODUCTION OF CHLOROISOCYANURATES
Bernard H. Nicolaisen, Stamford, Conn., assignor to Olin Mathieson Chemical Corporation
Continuation-in-part of application Ser. No. 486,250, Aug. 3, 1965. This application June 28, 1967, Ser. No. 649,654
5 Claims. (Cl. 260—248)

ABSTRACT OF THE DISCLOSURE

Chloroisocyanurates are prepared by introducing liquid chlorine into a body containing cyanuric acid or a cyanurate at a point where the pressure is approximately atmospheric while maintaining an absolute pressure below 50 millimeters of mercury at another part of the said body.

This application is a continuation-in-part of copending application, Ser. No. 486,250 filed Aug. 3, 1965, now abandoned, which is a division of Ser. No. 189,159 filed Apr. 20, 1962, now U.S. Patent 3,241,912 issued Mar. 22, 1966. That patent has claims directed to the manufacture of hypochlorites and chlorates. Divisional Ser. No. 486,250 and this application are directed to the manuafcture of chloroisocyanurates.

This invention relates to improvements in the chlorination of aqueous mixtures including single and polyphase systems, solutions, slurries, emulsions and suspensions. In a more particular aspect, the invention contemplates the chlorination of aqueous compositions containing cyanurates. Particular examples of suitable cyanurates include the alkali metal or alkaline earth metal cyanurates, suitably sodium or potassium cyanurates and cyanuric acid. The products of the process of this invention are the well-known chloroisocyanurates, useful as bleaching and sterilizing agents. Examples include dichloroisocyanuric acid, trichloroisocyanuric acid, sodium dichloroisocyanurate, potassium dichloroisocyanurate, calcium trichloroisocyanurate, potassium trichloroisocyanurate, sodium trichloroisocyanurate, lithium trichloroisocyanurate, mixtures of these compounds, double salts and hydrates thereof.

The process according to the present invention comprises, in a process for preparing a chloroisocyanurate by chlorinating an aqueous body containing a cyanurate selected from the group consisting of cyanuric acid and alkali metal and alkaline earth metal salts of cyanuric acid, the improvement of introducing liquid chlorine into said body at a point where the pressure is substantially atmospheric while maintaining an absolute pressure substantially below atmospheric at the surface of said body. In a particularly advantageous mode of carrying out the process of the invention, the flowing aqueous body is arranged in a vertically elongated manner with the head or surface of the aqueous body maintained at least 25 feet above the point or points of introduction of liquid chlorine. Because of the greater density of the aqueous mixtures compared to water, the pressure maintained at the points of chlorine introduction by 25 feet or more of aqueous mixture is approximately one atmosphere greater than that above the surface of the aqueous body. The effect is chlorination at atmospheric pressure or above while simultaneously the pressure is reduced to subatmospheric at the surface of the aqueous body, thus evaporating water from the aqueous body under substantially reduced pressure. Under these conditions the chlorine reacts extremely rapidly with the aqueous cyanurate to form the chloroisocyanurates.

In the chlorination of aqueous mixtures to form chloroisocyanurates, a considerable amount of heat of reaction is liberated and must be removed. It is necessary to remove this heat and to maintain the temperatures in the reaction mixture below about 50° C. and preferably below about 30° C. to prevent the decomposition of the chloroisocyanurates to nitrogen trichloride and other undesired products. It has previously been proposed to effect the chlorination of alkalies to form hypochlorites on a large scale by the introduction of liquid chlorine, for example as described in U.S. Patents 1,426,752; 1,481,106; 1,609,-755 and 1,609,758, taking advantage of the heat of vaporization of the liquid chlorine to absorb the heat of reaction. To the extent that the liquid chlorine absorbs heat in vaporization, this known method effects a degree of improvement. However, the heat of reaction of the chlorine is considerably larger than its heat of vaporization and additional cooling must be provided. In ordinary heat exchangers, cooling coils or other devices known to the art, an aqueous slurry deposits solid materials on the cold heat exchange surfaces and insulates them from the circulating slurry, rendering difficult or impossible the control of the temperatures of the reaction. When this deposition is severe, the rate of chlorine addition must be reduced and the maximum production capacity of the equipment cannot be utilized. The coating formed on the cooling surfaces depends on the composition being chlorinated and may be, for example, starting materials, intermediates or chlorination products difficultly soluble or stable at the temperatures provided by the cooling surface.

German Patents 941,970 and 963,418 disclose the use of reduced pressure to remove the heat evolved by the reaction of chlorine with aqueous solutions. The heat is removed in the form of the latent heat of vaporization of water. No cold surfaces are in contact with the reacting slurry and the heat is effectively removed while avoiding the insulation effect of precipitated solids on cold surfaces.

German Patent 941,970 proposes introducing chlorine under reduced pressure to obtain the cooling effect of evaporation of water. In such a simple system the chlorine, being the most volatile component of the system, tends to be removed in the direction of the reduced pressure and, in the absence of some elaboration of the system, the chlorine may largely escape without reaction from the aqueous mixture. This loss of chlorine results in low efficiency of conversion of the chlorine to a degree which cannot be tolerated. Furthermore, at ambient temperatures, chlorine is a fixed gas and the means of reducing the pressure on the system fail to function when large amounts of fixed gas are passed through. Thus water legs, steam jets and the like fail to reduce the pressure on a system to which a fixed gas is continuously supplied.

German Patent 963,418 further proposes to absorb chlorine in one stage and reduce the pressure in another stage and also to operate continuously. The patent teaches no adequate means for accomplishing the desired results and such means are not obvious to one skilled in the art.

The process of the present invention provides for utilization of the heat of vaporization of liquid chlorine and removes the remainder of the heat of reaction by evaporative cooling, avoiding loss of chlorine and avoiding the problem of heat exchange surfaces.

In the reaction of liquid chlorine with aqueous compositions, the heat of reaction is liberated largely at the point of chlorine introduction. Since the heat of vaporization of the chlorine is insufficient to absorb all of the heat of reaction, the aqueous mixture tends to overheat locally and to decompose the desired products. To overcome this deficiency, the process of the present invention additionally requires the circulation of the body of aqueous liquor between the chlorination zone in which excess heat of reaction is liberated, and the evaporation zone at the surface of the liquid level where heat is abstracted by evaporation. There are no heat transfer problems in this process. The circulation is rapid in order to maintain temperature and to prevent decomposition. The circulation may, for example, be sufficient to cycle the total volume of liquor from the heat producing zone to the heat abstracting zone and back in less than about 2 minutes. Practically it is not feasible to effect the complete turnover of the aqueous liquor in less than about 1 minute. When the body of aqueous liquor is completely recycled in from 1 to 2 minutes, the time provided for chlorine retention at a pressure of atmospheric or above is at least 20 seconds. This is ample provision for complete reaction of the chlorine since this has been found to be less than about 10 seconds in this environment.

The process of the present invention more particularly comprises chlorinating a body of aqueous mixture by maintaining an ascending and a descending column of said mixture, said columns connected at top and bottom, each of said columns having a minimum depth of 25 feet, introducing chlorine into said descending column at a minimum depth of 25 feet and maintaining an absolute pressure below atmospheric at the top of said body.

It is a particular advantage of the method of the present invention that, when desired, the temperature in the chlorination zone is maintained easily so that any localized temperature rise in the chlorination zone does not exceed about 5° C. With ordinary care this temperature rise need not exceed about 2° C. With pressure above the liquid level of 5 to 100 millimeters of mercury, preferably about 10 to 30 millimeters the temperatures are readily maintained below about 50° C. and may be maintained as low as about 10° C. Under these conditions of temperature, the evaporative chlorinators useful in the process of the present invention are appropriately sized to provide retention times from about 1 to 8 hours or more.

In the process of the present invention, it is convenient to control the chlorination to maintain the circulating aqueous body at any desired pH between about 1 and 5. In chlorination to form dichloroisocyanuric acid, for example, a pH of 3 to 4 is preferable. By means of suitable recorder-controllers, the pH can be used to control the input of fresh sodium cyanurate and/or chlorine in the operation of a continuous system. It is particularly convenient, however, to add the feed at a constant rate and use the variation in pH to control the input of liquid chlorine into the system. Control may also be effected based on the measurement of oxidation-reduction potential.

In a more particular aspect of the present invention, the improved chlorination is utilized in the manufacture of dichloroisocyanuric acid. A solution or slurry of sodium cyanurate is prepared by mixing suitable proportions of cyanuric acid, caustic and water. This is pumped into a surge chamber from which it flows downwardly through a conduit having a suitable length but at least 25 feet. At a point or points at least 25 feet below the liquid level in the surge tank, liquid chlorine is pumped into the downwardly flowing aqueous mixture. It is pumped back through a conduit returning to the surge tank. The pressure is reduced in the surge tank by any suitable means, for example, by steam jet to sub-atmospheric, suitably to 50 millimeters of mercury or less. Product slurry is withdrawn from the system, suitably at a point downstream from the chlorine inlet points and downstream from the pump means. Solid chloroisocyanurate product is separated from the withdrawn aqueous mixture by any suitable means including by filter, centrifuge or settler and suitably washed and dried. Mother liquor is recycled and combined with fresh feed. A particular advantage of the process of this invention is the avoidance of thick, partially chlorinated slurries which are difficult to stir, pump and further chlorinate and which are frequently encountered in prior art processes. In addition, the present process is more uniformly operated with less labor. Product quality and yields are improved.

Attached figure shows one embodiment of the chlorination operation of the present invention in an apparatus suitable for the process. The evaporative chlorinator comprises a surge chamber 11 with an eductor line 12 at the top. The surge chamber 11 is drawn down into a pipe 13 of about 40 ft. or more in length to form a descending arm. It turns into a return bend 14 at the bottom and thence into an ascending arm 15 which returns at 16 to the surge tank. Near the bottom of descending arm 13, liquid chlorine inlets 17, 18 and 19 are provided to which liquid chlorine is supplied by line 20. At the bottom of return bend 14 a means of flow transmission 21 is provided to produce circulation in the chlorinator. Line 22 is provided for the removal of the aqueous product to storage in tank 23. The aqueous product may be slurry or solution.

In the specific embodiment of the figure, cyanuric acid is charged via line 24, water via line 25 and caustic soda via line 26, all to form a supply of aqueous alkaline cyanurate in 27 from which it is moved via line 28 into surge chamber 11 as required.

Aqueous product is removed from storage in 23 via line 29 to separation zone 30 which represents any suitable separation means, for example, a filter or a centrifuge. Solid chloroisocyanurate product 32 is removed via line 31 and mother liquor is removed via line 33 to mother liquor storage 34. It is recycled from these via line 35 to combine with the feed in 27. The total operating capacity of the system is conveniently sized to produce at the desired rate.

In operation the system is charged with the aqueous cyanurate to be chlorinated until the surge tank is filled to a convenient liquid level usually about that of the return line of the circulating aqueous mixture. Circulation is started, the pressure is reduced at the top by any suitable eductor system and the introduction of liquid chlorine is started. pH measurement of the circulating liquor downstream from the chlorine inlets is used to control the rate of flow of chlorine. In batch operation, the pH controller is adjusted to stop the flow of chlorine suitably at any desired pH between 1 and 5. Suitable low temperatures are maintained by the evaporation of water from the aqueous liquor at the low pressure above the liquid level. Rapid circulation maintains the maximum temperature differential between the chlorination zone and the evaporative zone at less than about 2° C. In continuous operation the pH downstream from the chlorination zone controls the introduction of fresh aqueous feed or chlorine or both. Constant liquid level in the system is maintained by removal of aqueous product.

While the pressure at the liquid level in the system varies between 5 and 100 mm. of mercury, the pressure below the level of the chlorine inlets, in the return bend and at corresponding elevations in the ascending arm is atmospheric or greater.

Extra retention time when desired may be provided in the system shown in the drawing by expansion of a portion of the diameter of the ascending arm 15, by one or more loops at suitable points in the system or by other means. Additional stirring may also be provided at other points in the system.

It is further particularly advantageous to start the process of the present invention by filling or partially filling the system with water, recycle or fresh solutions or slurries. The apparatus and process are surprisingly simple to construct and operate on the large scale with minimum requirements of labor.

Example I

A slurry formed by mixing cyanuric acid, sodium hydroxide and water in the proportions of 13:8:79 was charged to and circulated in the chlorinator of figure.

The pressure at the top of the liquid was maintained at 16 mm. Hg which resulted in a temperature of 20° C. Liquid chlorine was introduced into the circulating slurry in the descending arm at a point where the pressure was near atmospheric. Any nitrogen trichloride byproduct of the chlorination was removed in the stream of evaporating water vapor. The chlorine rate was adjusted to maintain a pH of about 2.5 in the slurry in the ascending arm. When the chloriation was complete the dichlorocyanuric acid product was separated from the mother liquior by centrifuging.

Example II

An aqueous solution of sodium cyanurate formed by neutralizing 5220 parts by weight (40.4 mols) of cyanuric acid and 3258 parts by weight (81.41 mols) of NaOH in 41,971 parts by weight of water was charged at a rate which introduced 396 parts per hour of cyanuric acid into a reaction vessel for a time of 13.2 hours. Liquid chlorine was pumped into the aqueous solution near the bottom where the pressure was substantially atmospheric at a rate of 482 parts by weight per hour. The mol ratio of NaOH to cyanuric acid was 2.016:1 and the mol ratio of chlorine to cyanuric acid was 2.22:1. The resulting reaction mixture had a pH of 3.8.

While the chlorine and sodium cyanurate solution were being introduced, the reaction mixture was pumped to a surge chamber where an absolute pressure of 12.5 mm. Hg was maintained at the surface of the resulting slurry. Evaporative cooling maintained the temperature of the reaction mixture at 18.5° C. A portion of the reaction mixture was simultaneously recycled to the point of chlorine introduction and a portion was removed for product separation.

After 13.2 hours, the accumulated product slurry was centrifuged to separate the solid dichlorocyanuric acid product which accounted for 57.2% of the cyanuric acid charged. An additional 24.6% of the cyanruic acid charged remained in the liquor as dissolved dichlorocyanuric acid. Thus 81.8% of the cyanuric acid charged was accounted for. The liquor from the centrifuge was used in another run.

Example III

An aqeuous solution of sodium cyanurate formed by neutralizing 9358 parts by weight (72.5 mols) of cyanuric acid and 5812 parts by weight (145.2 mols) of NaOH in 57,321 parts by weight of water was charged at a rate which introduced 678 parts per hour of cyanuric acid into a reaction vessel for a time of 13.8 hours. Liquid chlorine was pumped into the aqueous solution near the bottom where the pressure was substantially atmospheric at a rate of 790 parts by weight per hour. The mol ratio of NaOH to cyanuric acid was 2.004:1 and the mol ratio of chlorine to cyanuric acid was 2.12:1. The resulting reaction mixture had a pH of 3.7.

While the chlorine and sodium cyanurate solution were being introduced, the reaction mixture was pumped to a surge chamber where an absolute pressure of 14.6 mm. Hg was maintained at the surface of the resulting slurry. Evaporative cooling maintained the temperature of the reaction mixture at 21.1° C. A portion of the reaction mixture was simultaneously recycled to the point of chlorine introduction and a portion was removed for product separation.

After 13.8 hours, the accumulated product slurry was centrifuged to separate the solid dichlorocyanuric acid product which accounted for 68.6% of the cyanuric acid charged. An additional 24.4% of the cyanuric acid charged remained in the liquor as dissolved dichlorocyanuric acid. Thus 93.0% of the cyanuric acid charged was accounted for. The liquor from the centrifuge was used in another run.

Example IV

An aqueous solution of sodium cyanurate was formed by neutralizing 1820 parts by weight (14.1 mols) of cyanuric acid and 1130 parts by weight (28.25 mols) of NaOH in 11,150 parts by weight of water. The solution was charged at a rate which introduced 455 parts per hour of cyanuric acid into a reaction vessel for a time of 4 hours. Liquid chlorine was pumped into the aqueous solution near the bottom where the pressure was substantially atmospheric at a rate of 533 parts by weight per hour. The reaction mixture from time to time had a pH ranging from 3.3 to 3.6.

While the chlorine and sodium cyanurate solution were being introduced, the reaction mixture was pumped to a surge chamber where absolute pressure was maintained in the range of 21.5 to 27 mm. Hg at the surface of the resulting slurry. Evaporative cooling maintained the temperature of the reaction mixture between 23 and 27° C. A portion of the reaction mixture was simultaneously recycled to the point of chlorine introduction and a portion was removed for product separation.

After 4 hours, the accumulated product slurry was centrifuged to separate the solid dichlorocyanuric acid product which accounted for 59.5% of the cyanuric acid charged. An additional 20.6% of the cyanuric acid charged remained in the liquor as dissolved dichlorocyanuric acid. Thus 80.1% of the cyanuric acid charged was accounted for. The liquor from the centrifuge was used in another run.

Example V

An aqueous solution of sodium cyanurate formed by neutralizing 1820 parts by weight (14.1 mols) of cyanuric acid and 1130 parts by weight (28.25 mols) of NaOH in 11,150 parts by weight of water was charged at a rate which introduced 455 parts per hour of cyanuric acid into a reaction vessel for a time of 4 hours. Liquid chlorine was pumped into the aqueous solution near the bottom where the pressure was substantially atmospheric at a rate of 591 parts by weight per hour. The reaction mixture had a pH which varied between 3.4 and 3.6.

While the chlorine and sodium cyanurate solution were being introduced, the reaction mixture was pumped to a surge chamber where absolute pressure in the range of 26 to 30 mm. Hg was maintained at the surface of the resulting slurry. Evaporative cooling maintained the temperature of the reaction mixture at 24 to 28° C. A portion of the reaction mixture was simultaneously recycled to the point of chlorine introduction and a portion was removed for product separation.

After 4 hours, the accumulated product slurry was centrifuged to separate the solid dichlorocyanuric acid product which accounted for 61.1% of the cyanuric acid charged. An additional 25.2% of the cyanuric acid charged remained in the liquor as dissolved dichlorocyanuric acid. Thus 86.3% of the cyanuric acid charged was accounted for. The liquor from the centrifuge was used in another run.

Example VI

An aqueous solution of sodium cyanurate formed by neutralizing 1360 parts by weight (10.5 mols) of cyanuric acid and 844 parts by weight (21.1 mols) of NaOH in 8346 parts by weight of water was charged at a rate which introduced 850 parts per hour of cyanuric acid into a reaction vessel for a time of 1.6 hours. Liquid chlorine was pumped into the aqueous solution near the bottom where the pressure was substantially atmospheric at a rate of 131.4 parts by weight per hour. The reaction mixture ranged in pH from 3.3 to 3.8.

While the chlorine and sodium cyanurate solution were being introduced, the reaction mixture was pumped to a surge chamber where absolute pressure ranging from 23 to 25 mm. Hg was maintained at the surface of the resulting slurry. Evaporative cooling maintained the temperature of the reaction mixture between 24.5 and 27° C. A portion of the reaction mixture was simultaneously recycled to the point of chlorine introduction and a portion was removed for product separation.

After 1.6 hours, the accumulated product slurry was centrifuged to separate the solid dichlorocyanuric acid product which accounted for 60.0% of the cyanuric acid charged. An additional 20.7% of the cyanuric acid charged remained in the liquor as dissolved dichlorocyanuric acid. Thus 80.7% of the cyanuric acid charged was accounted for. The liquor from the centrifuge was used in another run.

What is claimed is:

1. In a process for preparing a chloroisocyanurate by chlorinating an aqueous body containing a cyanurate selected from the group consisting of cyanuric acid and alkali metal and alkaline earth metal salts of cyanuric acid, the improvement of introducing liquid chlorine into said body at a point where the pressure is substantially atmospheric while maintaining an absolute pressure substantially below atmospheric at the surface of said body.

2. The improvement as claimed in claim 1 wherein the point at which liquid chlorine is introduced is at least 25 feet below said surface.

3. The improvement as claimed in claim 1 wherein the temperature is maintained below 50° C.

4. The improvement as claimed in claim 1 wherein the absolute pressure at the surface of said body is below 100 millimeters of mercury.

5. The improvement as claimed in claim 1 wherein said aqueous body is aqueous alkaline sodium cyanurate, fresh aqueous alkaline sodium cyanurate is continuously added to said aqueous body and the volume of said aqueous body is maintained substantially constant by continuously removing a portion of said aqueous body.

References Cited

UNITED STATES PATENTS

| | | | |
|---|---|---|---|
| 2,938,032 | 5/1960 | Hügel et al. | 260—248 |
| 2,964,525 | 12/1960 | Robinson | 260—248 |
| 2,970,998 | 2/1961 | Tribit | 260—248 |
| 3,073,823 | 1/1963 | Merkel et al. | 260—248 |
| 3,178,429 | 4/1965 | Vazopolos | 260—248 |
| 3,184,458 | 5/1965 | Frazier | 260—248 |

JOHN D. RANDOLPH, *Primary Examiner.*

J. M. FORD, *Assistant Examiner.*